United States Patent [19]

Mills et al.

[11] Patent Number: 5,480,715
[45] Date of Patent: Jan. 2, 1996

[54] POLYMERIC FILM CONTAINING SILICONE RESIN PARTICLES

[75] Inventors: Paul D. Mills, Darlington; Karl Rakos, Nr. Ferryhill, both of United Kingdom

[73] Assignee: Imperial Chemical Industries PLC, London, England

[21] Appl. No.: 170,802

[22] Filed: Dec. 21, 1993

[30] Foreign Application Priority Data

Dec. 23, 1992 [GB] United Kingdom ............... 9226866
Dec. 23, 1992 [GB] United Kingdom ............... 9226867

[51] Int. Cl.$^6$ ............................ B32B 5/16; B32B 27/06; B32B 27/36
[52] U.S. Cl. ........................................ 428/327; 428/480
[58] Field of Search ................... 428/480, 327, 428/331, 402, 407, 447, 323, 483, 694 ST, 694 SL, 694 SG; 525/474, 446

[56] References Cited

U.S. PATENT DOCUMENTS

| | | | |
|---|---|---|---|
| 4,533,509 | 8/1985 | Gust et al. | 264/171 |
| 4,761,327 | 8/1988 | Hamano et al. | 428/220 |
| 4,820,583 | 4/1989 | Miquel et al. | 428/333 |
| 4,840,836 | 6/1989 | Eyraud | 428/213 |
| 5,212,012 | 5/1993 | Culbertson | 428/336 |
| 5,266,397 | 11/1993 | Ogawa et al. | 428/323 |

FOREIGN PATENT DOCUMENTS

| | | |
|---|---|---|
| 35835 | 9/1981 | European Pat. Off. . |
| 229670 | 6/1992 | European Pat. Off. . |
| 2177471 | 11/1973 | France . |
| 2229112 | 12/1974 | France . |
| 63-278939 | 11/1988 | Japan . |
| 1204959 | 8/1989 | Japan . |
| 453742 | 2/1992 | Japan . |
| 838708 | 6/1960 | United Kingdom . |
| 1397653 | 6/1975 | United Kingdom . |
| 1428331 | 3/1976 | United Kingdom . |
| 1465973 | 3/1977 | United Kingdom . |
| 1476343 | 10/1977 | United Kingdom . |

OTHER PUBLICATIONS

Database WPI, Week 9215, Derwent Publications Ltd., London, GB; AN92–117987 (15) & JP–A–4 053 742 (Toray Ind Inc) Feb. 1992.
Database WPI, Week 9234, Derwent Publications Ltd., GB; AN92–280294 (34) & JP–A–4 191 045 (Toyobo KK), Jul, 9, 1992.
Database WPI, Week 9251, Derwent Publications Ltd., London, GB; AN 92–429544 (51) & JP–A–4 316 843 (Toray Ind Inc) Nov. 9, 1992.
Database WPI, Week 9130, Derwent Publications Ltd., London, GB; AN 91–218952 (30) & JP–A–3 140 336 (Toray Ind Inc) Jun. 14, 1991.
Database WPI, Week 9244, Derwent Publications Ltd., London, GB; AN92–360048 (44) JP–A–4 259 535 (Toray Ind Inc) Sep. 16, 1992.
Database WPI, Week 9040, Derwent Publications Ltd., London, GB; AN 90–302342 (49) & JP–A–2 214 657 (Teijin KK) Aug. 27, 1990.

Primary Examiner—D. S. Nakarani
Assistant Examiner—Vivian Chen
Attorney, Agent, or Firm—Cushman Darby & Cushman

[57] ABSTRACT

A polyester film comprising an essentially unfilled primary layer and a filled secondary layer exhibiting an improved combination of transparency and handling properties. The filler is silicone resin particles having a volume distributed median particle diameter of 1.9 to 3.5 μm, which are present in the secondary layer at a concentration of 200 to 400 ppm, in combination with silicone resin particles having a volume distributed median particle diameter of 0.6 to 0.9 μm, which are present in the secondary layer at a concentration of 100 to 250 ppm. The film is suitable for use in a wide range of applications, particularly for information storage and display.

2 Claims, 1 Drawing Sheet

POLYMERIC FILM CONTAINING SILICONE RESIN PARTICLES

This invention relates to a polymeric film, and in particular to a composite polyester film.

BACKGROUND OF THE INVENTION

It is known that polymeric films often have poor handling properties which may result in difficulties in winding the films into high quality reels and inefficient passage through processing, for example, slitting, equipment. Film handling properties can be improved by increasing the surface roughness of the film, suitably by the use of coatings, or alternatively by incorporating fillers, ie organic or inorganic particles into the film. A combination of coatings and fillers may be used to improve film handling properties. The problem with using coatings to improve film handleability is that they limit the range of uses to which the film may be applied because of the difficulty in applying additional coating layers which may be required, for example, to provide antistatic, adhesion promoting or release properties. Filler incorporated into a coating layer is susceptible to abrasion and loss from the coating layer.

A wide range of fillers have been incorporated into films to improve handling properties, such as titanium dioxide, calcium carbonate, glass, barium sulphate, silica, kaolin, china clay, zeeospheres and calcium phosphates. However, the presence of these fillers in the film results in a depreciation in the optical clarity and an increase in the haze, of the film.

Optical clarity and transparency are important criteria in a wide range of film applications, such as packaging, metallised films, reprographic films and films for general industrial use. There is a continuing need for films exhibiting high light transmittance, low haze and excellent handling properties. One way of reducing this problem is to produce a clear base film with a thin layer of material containing a filler, which can act as an anti-blocking agent, without reducing the overall transparency of the composite film to unacceptable levels. U.S. Pat. No. 4,533,509 describes polyester films of this type.

Polyester film composites comprising a layer of transparent homo-polyester and a layer of transparent copolyester are described in GB Patent No 1,465,973. European Patent No 35835 describes a similar polyester film composite wherein the filler in the copolyester layer has an average particle size greater than the thickness of the layer. The filler particles protrude through the copolyester layer yielding a film with good anti-block properties whilst increasing the transparency and heat-sealability thereof. However, the aforementioned properties are only achieved at certain copolyester layer thickness/filler particle size ratios, such that any variation required in the copolyester layer thickness (for example for a different commercial application) necessitates a change in the filler particle size. This situation can result in a range of different fillers being required for different applications.

European Patent No 229670 discloses a polyester monofilm comprising 0.005% to 1% of silicone resin particles having an average particle diameter of 0.01 μm to 4 μm. The film is used in magnetic recording media.

We have surprisingly overcome or substantially reduced one or more of the aforementioned problems.

SUMMARY OF THE INVENTION

Accordingly, the present invention provides a transparent polymeric film comprising an essentially unfilled primary layer of polyester material having on at least one surface thereof a secondary layer of polyester material comprising, based upon the weight of the polyester in the secondary layer, from 200 to 400 ppm of silicone resin particles having a volume distributed median particle diameter of 1.9 to 3.5 μm and from 100 to 250 ppm of silicone resin particles having a volume distributed median particle diameter of 0.6 to 0.9 μm.

The invention also provides a method of producing a polymeric film by forming an essentially unfilled primary layer of polyester material having on at least one surface thereof a secondary layer of polyester material comprising, based upon the weight of the polyester in the secondary layer, from 200 to 400 ppm of silicone resin particles having a volume distributed median particle diameter of 1.9 to 3.5 μm and from 100 to 250 ppm of silicon resin particles having a volume distributed median particle diameter of 0.6 to 0.9 μm.

DETAILED DESCRIPTION OF THE PREFERRED EMBODIMENTS

The polymeric film is a self-supporting film, ie a self-supporting structure capable of independent existence in the absence of a supporting base.

The polymeric film primary layer or substrate according to the invention may be formed from any synthetic, film-forming polyester material. A synthetic linear polyester is preferred, especially one which may be obtained by condensing one or more dicarboxylic acids or their lower alkyl (up to 6 carbon atoms) diesters, e.g. terephthalic acid, isophthalic acid, phthalic acid, 2,5- 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, particularly aliphatic glycols, e.g. ethylene glycol, 1,3-propanediol, 1,4-butanediol, neopentyl glycol and 1,4-cyclohexanedimethanol. A polyethylene terephthalate or polyethylene naphthalate film is preferred. A polyethylene terephthalate film is particularly preferred, especially such a film which has been biaxially oriented by sequential stretching in two mutually perpendicular directions, typically at a temperature in the range 70° to 125°, and preferably heat set, typically at a temperature in the range 150° to 250°, for example as described in British patent 838708.

The secondary layer of a polymeric film according to the invention comprises any one or more of the polyester materials hereinbefore described as being suitable for use in forming the polyester primary layer. In a preferred embodiment of the invention the primary layer and secondary layer comprise the same polyester material, more preferably polyethylene terephthalate. Both the primary and secondary layer preferably comprise semi-crystalline or crystalline polyester.

The polymeric film according to the invention may be unoriented, or uniaxially oriented, but is preferably biaxially oriented by drawing in two mutually perpendicular directions in the plane of the film to achieve a satisfactory combination of mechanical and physical properties. Simultaneous biaxial orientation may be effected by extruding a polyester tube which is subsequently quenched, reheated and then expanded by internal gas pressure to induce transverse orientation, and withdrawn at a rate which will induce longitudinal orientation. Sequential stretching may be effected in a stenter process by extruding the thermoplastics polyester as a flat extrudate which is subsequently stretched first in one direction and then in the other mutually perpendicular direction. Generally, it is preferred to stretch firstly in the longitudinal direction, ie the forward direction through the film stretching machine, and then in the transverse direction. A stretched film may be, and preferably is, dimensionally stabilised by heat-setting under dimensional restraint at a temperature above the glass transition temperature thereof.

Formation of the secondary layer on the primary layer may be effected by conventional techniques—for example, by casting the secondary layer polyester onto a preformed primary layer. Conveniently, however, formation of a composite sheet (primary and secondary layer) is effected by coextrusion, either by simultaneous coextrusion of the respective film-forming layers through independent orifices of a multi-orifice die, and thereafter uniting the still molten layers, or, preferably, by single-channel coextrusion in which molten streams of the respective polyesters are first united within a channel leading to a die manifold, and thereafter extruded together from the die orifice under conditions of streamline flow without intermixing thereby to produce a composite sheet. A coextruded sheet is stretched to effect molecular orientation of the primary layer, and preferably also of the secondary layer. In addition, the composite sheet is preferably heat-set.

Secondary layers may be disposed on one or both sides of the primary layer. The film composites may have a total thickness in the range 10 to 500 μm, preferably 30 to 175 μm, and the or each secondary layer(s) preferably constitute from 1 to 25% of the total film thickness. The secondary layers preferably have a thickness of up to 20 μm, more preferably from 0.5 to 10 μm, and especially from 1.0 to 5 μm.

The polymeric film of the present invention is transparent, preferably having a wide angle haze, for a 75 μm thick film, of <1.0%, more preferably <0.9%, especially <0.8%, and particularly <0.7%, being measured according to the standard ASTM D 1003-61.

The secondary layer surface of a polymeric film according to the invention preferably exhibits a static coefficient of friction, when measured against itself, of <0.8, preferably <0.6, especially <0.4, and particularly <0.3.

The primary layer of a polymeric film according to the invention contains little or no filler, in order to yield a film of maximum transparency. However, the primary layer may contain relatively small quantities of filler material, preferably less than 200 ppm, more preferably less than 100 ppm, and particularly less than 50 ppm, for example due to the normal practice of using scrap film, ie reclaim, in the film manufacturing process. The transparency of the film is reduced when reclaim which contains filler is used in the primary layer. Normally from 5% up to 70% of reclaim is used. Preferably about 50% of reclaim and 50% of fresh or virgin polyester is used. Thus, a polymeric film according to the invention which contains reclaim, at least in the primary layer, preferably has a wide angle haze, for a 75 μm thick film, of <1.5%, more preferably <1.2%, especially <1.0%, and particularly <0.8%, being measured according to the standard ASTM D 1003-61. The reclaim is preferably obtained, at least partially, in the production of a polymeric film according to the present invention.

It is a particularly surprising feature of the invention that a polymeric film containing reclaim can be produced which has a wide angle haze of <1.0%, preferably <0.8%, for a 75 μm thick film, and a static coefficient of friction of the secondary layer, when measured against itself, of <0.4, preferably <0.3.

The silicone resin particles suitable for use in the secondary layer of a polymeric film according to the present invention preferably comprise a cross-linked three-dimensional network of siloxane linkages, represented by the structures

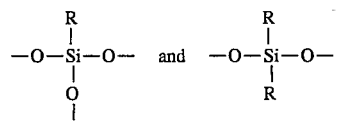

wherein R is an organic group, such as an aliphatic hydrocarbon e.g. methyl, ethyl or butyl group, or an aromatic hydrocarbon e.g. phenyl group, or an unsaturated hydrocarbon e.g. vinyl group. R may comprise a mixture of any two or more of the aforementioned hydrocarbon groups. In a preferred embodiment of the invention R is a methyl group. Particularly preferred silicone resin particles comprise methyl sesquioxane. Suitable silicone resin particles are commercially available, for example "Tospearl" silicone resin particles available from Toshiba Silicone Co Ltd, Japan.

The silicone resin particles for use in the present invention are preferably of approximately, more preferably of substantially, circular cross-section irrespective of the selected viewing point. Desirably, an individual silicone resin particle exhibits an aspect ratio $d_1:d_2$ (where $d_1$ and $d_2$, respectively, are the maximum and minimum dimensions of the particle) in a range of from 1:1 to 1:0.5, preferably from 1:1 to 1:0.8, and especially from 1:1 to 1:0.9.

The volume distributed median particle diameter (equivalent spherical diameter corresponding to 50% of the volume of all the particles, read on the cumulative distribution curve relating volume 1 to the diameter of the particles—often referred to as the "D(v, 0.5)" value) of the silicone resin particles incorporated into the secondary layer of a polymeric film according to the invention is in a range from 1.5 to 12.5 μm, preferably 1.8 to 5.0 μm, more preferably 1.9 to 3.5 μm, and especially 1.9 to 3.2 μm. The size distribution of the silicone resin particles is also an important parameter, for example the presence of excessively large particles can result in the film exhibiting unsightly 'speckle', ie where the presence of individual filler particles in the film can be discerned with the naked eye. Desirably, therefore, the actual particle size of 99.9% by volume of the particles should not exceed 20 μm, and preferably not exceed 15 μm. Preferably at least 90%, more preferably at least 95% by volume of the silicone resin particles are within the range of the volume distributed median particle diameter ±1.5 μm, and particularly ±1.0 μm.

In order to obtain the advantageous properties of the present invention the concentration of silicone resin particles, having a volume distributed median particle diameter as hereinbefore defined, present in the secondary layer should be in the range from 100 to 1000 ppm, preferably from 150 to 800 ppm, more preferably from 200 to 700 ppm, particularly from 350 to 700 ppm, and especially from 500 to 600 ppm, based upon the weight of the polyester in the secondary layer.

In a preferred embodiment of the invention, the secondary layer additionally comprises silicone resin particles (hereinafter referred to as "small" silicone resin particles) having a volume distributed median particle diameter less than that of the silicone resin particles (or "large" silicone resin particles) hereinbefore described. The volume distributed median particle diameter of the small silicone resin particles incorporated into the secondary layer is preferably 0.2 to 1.0 μm, more preferably 0.4 to 1.0 μm, and especially 0.6 to 0.9 μm. Preferably, the actual particle size of 99.9% by volume of the small silicone resin particles should not exceed 15 μm, and preferably not exceed 10 μm. Preferably at least 90%, more preferably at least 95% by volume of the small silicone resin particles are within the range of the volume distributed median particle diameter ±1.0 μm, and particularly ±0.5 μm. The presence of an excessive number of very small particles in the film can result in an unacceptable increase in haze.

The concentration of small silicone resin particles present in the secondary layer is preferably in the range from 100 to 1000 ppm, more preferably from 100 to 700 ppm, particularly from 100 to 300 ppm and especially from 120 to 250 ppm, based upon the weight of the polyester in the secondary layer.

In one preferred embodiment of the invention, the secondary layer comprises from 200 to 400 ppm of silicone resin particles having a volume distributed median particle diameter of 1.9 to 3.5 μm, and from 170 to 250 ppm of silicone resin particles having a volume distributed median particle diameter of 0.6 to 0.9 μm.

The silicone resin particles for use in accordance with the invention preferably comprise a non-agglomerating additive, the primary particle structure of which remains inviolate during compounding with the film-forming polyester, and film formation therefrom, whereby the discrete particle form of the silicone resin is retained in the finished film.

Particle sizes of the silicone resin particles may be measured by electron microscope, Coulter counter, sedimentation analysis and light scattering, preferably techniques based on laser light diffraction. The median particle size may be determined by plotting a cumulative distribution curve representing the percentage of particle volume below chosen particle sizes and measuring the 50th percentile.

The silicone resin particles may be added to the polyester secondary layer or polyester secondary layer-forming material at any point in the film manufacturing process prior to the extrusion of the polyester. For example, the silicone resin particles may be added during monomer transfer or in the autoclave, although it is preferred to incorporate the silicone resin particles as a glycol dispersion during the esterification reaction stage of the polyester synthesis. Alternatively, the silicone resin particles may be added as a dry powder into the polymer melt via a twin-screw extruder or by masterbatch technology.

The layers of a film according to the invention may conveniently contain any of the additives conventionally employed in the manufacture of polyester films. Thus, agents such as dyes, pigments, lubricants, anti-oxidants, anti-blocking agents, surface active agents, slip aids, gloss-improvers, prodegradants, ultra-violet light stabilisers, viscosity modifiers and dispersion stabilisers may be incorporated in the primary and/or secondary layer(s), as appropriate. The additives will preferably not increase the wide angle haze of the polymeric film up to or above the aforementioned values.

A polymeric film according to the invention may be coated on one or both surfaces with one or more additional coating, ink, lacquer and/or metal layers, for example to form a laminate or composite which exhibits improved properties, such as antistatic, adhesion promoting or release, compared with the component materials. A preferred anti-static coating layer comprises a quaternary ammonium compound, preferably in combination with an acrylic resin.

Prior to the deposition of a coating medium onto the primary and/or secondary layer, the exposed surface thereof may, if desired, be subjected to a chemical or physical surface-modifying treatment to improve the bond between that surface and the subsequently applied coating layer. A preferred treatment is corona discharge, which may be effected in air at atmospheric pressure with conventional equipment using a high frequency, high voltage generator, preferably having a power output of from 1 to 20 kw at a potential of 1 to 100 kv. Discharge is conveniently accomplished by passing the film over a dielectric support roller at the discharge station at a linear speed preferably of 1.0 to 500 m per minute. The discharge electrodes may be positioned 0.1 to 10.0 mm from the moving film surface. Alternatively, the surface of the film may be pretreated with an agent known in the art to have a solvent or swelling action on the polyester layer. Examples of such agents which are particularly suitable for the treatment of a polyester film surface include a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The coating medium my be applied to an already oriented polymeric film surface, but application of the coating medium is preferably effected before or during the stretching operation.

In particular, it is preferred that the coating medium should be applied to the film primary and/or secondary layer between the two stages (longitudinal and transverse) of a thermoplastics film biaxial stretching operation. Such a sequence of stretching and coating is especially preferred for the production of a coated polyester film comprising a polyethylene terephthalate primary and/or secondary layer, which is preferably firstly stretched in the longitudinal direction over a series of rotating rollers, coated with the coating layer, and then stretched transversely in a stenter oven, preferably followed by heat setting.

Polymeric films according to the invention are suitable for use in a wide range of film applications, such as packaging, e.g. as carton windows, metallised films, reprographic films and films for general industrial use. Polymeric films described herein are particularly suitable for information storage and display, such as montage, masking, stencil, overhead projection, membrane touch switch, microfilm and printing, such as thermal wax transfer printing. Films according to the invention may exhibit anti-Newton ring properties which may be an important advantage in certain reprographic applications.

In this specification the following test methods have been used to determine certain properties of the polymeric film:

The static coefficient of friction of the secondary layer surface of the polymeric film was measured against itself by an inclined plane method based on ASTM test D 4518-87, using a Model IPST (Specialist Engineering, Welwyn, UK).

Wide angle haze was determined as the percentage of transmitted light which deviates from the normal to the surface of the film by an average amount greater than 2.5° of arc during passage through the film, essentially according to ASTM test D 1003-61, using a Hazegard XL211 Hazemeter (BYK Gardner, US).

The handling and winding properties of the film were evaluated on a slitting machine. Reels of length between 1000 m and 3000 m, and width between 500 mm and 2000 mm were slit at speeds between 50 and 400 meters per minute. The resultant slit reels were assessed for their physical appearance.

BRIEF DESCRIPTION OF THE DRAWINGS

The invention is illustrated by reference to the accompanying drawings in which:

Referring to FIG. 1 of the drawings, the film comprises a polyester primary layer (1) having a secondary layer (2) bonded to one surface (3) thereof.

Figure 1:
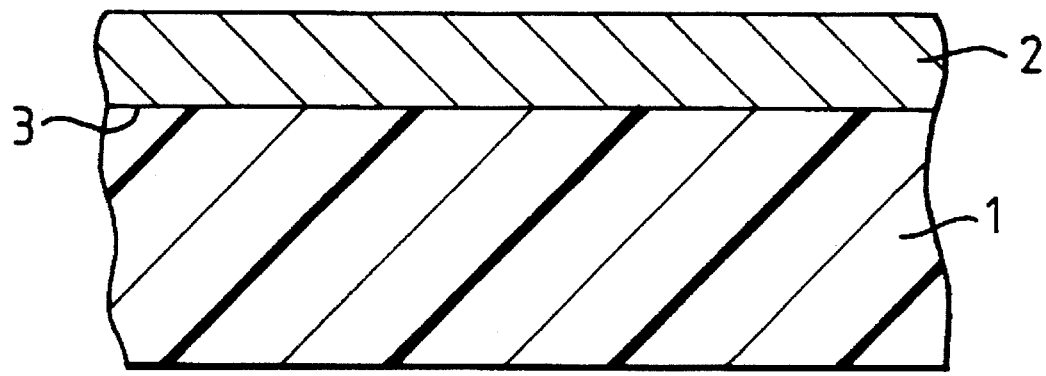
FIG. 1 is a schematic sectional elevation, not to scale, of a polymeric film having a secondary layer adhered directly to a first surface of a primary layer.
Figure 2:
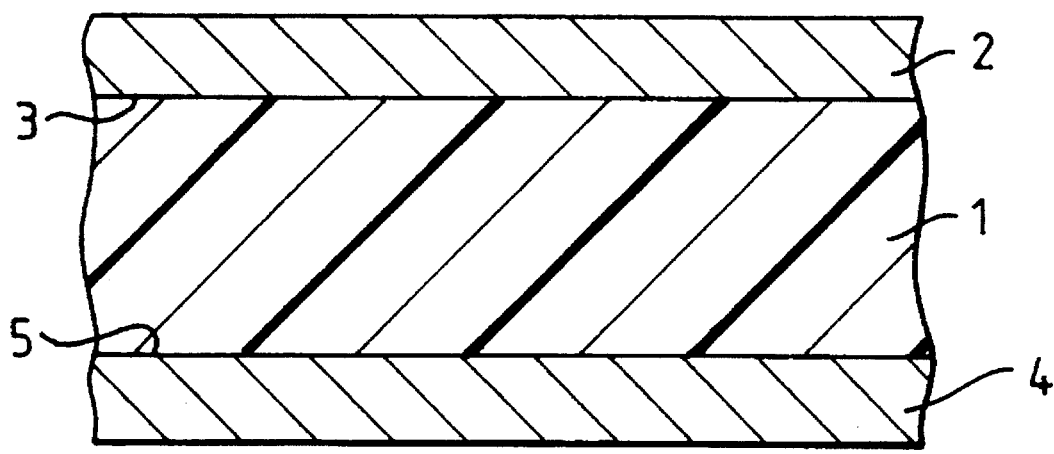
FIG. 2 is a similar schematic elevation of a polymeric film with an additional secondary layer adhered to the second surface of the primary layer.

The film of FIG. 2 further comprises an additional secondary layer (4), bonded to the second surface (5) of the primary layer (1).

The invention is further illustrated by reference to the following Examples.

EXAMPLE 1

Film composites comprising unfilled polyethylene terephthalate as the primary layer and two secondary layers comprising polyethylene terephthalate containing approximately 600 ppm of silicone resin particles having a volume distributed median particle diameter of 3.0 μm (Tospearl 130, supplied by Toshiba Silicone Co Ltd, Japan), measured using a Coulter LS130 particle sizer, were produced by a process of single channel coextrusion wherein streams of unfilled and filled polyethylene terephthalate supplied by separate extruders were united in a tube leading to the manifold of an extrusion die and were extruded simultaneously through the die under conditions of streamline flow and without intermixing. The film composite emerging from the extrusion die was quenched immediately upon a water-cooled rotating metal drum having a polished surface and stretched to 3.3 times its original dimension in the direction of extrusion at a temperature of about 80° C. The longitudinally stretched film was then stretched transversely in a stenter oven to 3.3 times its original dimension at a temperature of about 120° C. The film composite was finally heat set under dimensional restraint in a stenter oven at a temperature of about 220° C.

The resulting film composite consisted of a biaxially oriented and heat-set unfilled polyethylene terephthalate primary layer and two filled polyethylene terephthalate secondary layers. Final film thickness was 60 μm, each secondary layer being about 1.5 μm thick. The film was subjected to the test methods described above and exhibited the following characteristics:

1) The static coefficient of friction of the secondary layer=0.26
2) Haze=0.6%

The slit reels produced in the winding test were of excellent physical appearance with no sign of "telescoping" or "wander", pimple-like defects or a high edge at the ends of a slit reel.

EXAMPLE 2

This is a comparative example not according to the invention. The procedure of Example 1 was repeated except that each of the two secondary layers contained 1550 ppm of china clay of median particle size 0.8 μm. The film was subjected to the test methods described above and exhibited the following characteristics:

1) The static coefficient of friction of the secondary layer=0.37
2) Haze=3.7%

The slit reels produced in the winding test were of excellent physical appearance with no sign of "telescoping" or "wander", pimple-like defects or a high edge at the ends of a slit reel. However, these winding properties could only be achieved with film having an unacceptable haze value of 3.7%.

EXAMPLE 3

The procedure of Example 1 was repeated except that each of the two secondary layers contained approximately 200 ppm of silicone resin particles having a volume distributed median particle diameter of 2.0 μm (Tospearl 120) and approximately 240 ppm of silicone resin particles having a volume distributed median particle diameter of 0.8 μm (Tospearl 108). Both Tospearl 120 and 108 were supplied by Toshiba Silicone Co Ltd, Japan, and the volume distributed median particle diameter thereof was measured using a Coulter LS130 particle sizer. The film was subjected to the test methods described above and exhibited the following characteristics:

1) The static coefficient of friction of the secondary layer=0.26
2) Haze=0.6%

The slit reels produced in the winding test were of excellent physical appearance with no sign of "telescoping" or "wander", pimple-like defects or a high edge at the ends of a slit reel.

EXAMPLE 4

The procedure of Example 3 was repeated except that each of the two secondary layers contained approximately 300 ppm of silicone resin particles having a volume distributed median particle diameter of 3.0 μm (Tospearl 130) and approximately 120 ppm of silicone resin particles having a volume distributed median particle diameter of 0.8 μm (Tospearl 108). The film was subjected to the test methods described above and exhibited the following characteristics:

1) The static coefficient of friction of the secondary layer=0.31
2) Haze=0.6%

EXAMPLE 5

The procedure of Example 3 was repeated except that each of the two secondary layers contained approximately 300 ppm of silicone resin particles having a volume distributed median particle diameter of 3.0 μm (Tospearl 130) and approximately 240 ppm of silicone resin particles having a volume distributed median particle diameter of 0.8 μm (Tospearl 108). The film was subjected to the test methods described above and exhibited the following characteristics:

1) The static coefficient of friction of the secondary layer=0.24
2) Haze=0.65%

The above results illustrate the improved properties of polymeric films according to the present invention.

We claim:

1. A transparent polymeric film comprising an essentially unfilled primary layer of polyester material having on at least one surface thereof a secondary layer of polyester material comprising, based upon the weight of the polyester in the secondary layer, from 200 to 400 ppm of silicone resin particles having a volume distributed median particle diameter of 1.9 to 3.5 μm, and from 100 to 250 ppm of silicone resin particles having a volume distributed median particle diameter of 0.6 to 0.9 μm, said film having a wide angle haze, for a 75 μm thick film, of less than 0.8% and wherein the static coefficient of friction of the secondary layer measured against itself is less than 0.4.

2. A film according to claim 1 wherein both the primary layer and the secondary layer comprise crystalline or semi-crystalline polyethylene terephthalate.

* * * * *